United States Patent [19]
Tamura et al.

[11] 3,875,020
[45] Apr. 1, 1975

[54] EXTRACTIVE RECOVERY OF PALLADIUM CATALYST IN THE PRESENCE OF NITRIC ACID FROM THE RESIDUE OF AN ARYL ESTER DISTILLATION

[75] Inventors: Nobuhiro Tamura, Ooimachi; Kazuo Suga; Naoya Kominami, both of Tokyo, all of Japan

[73] Assignee: Asahi Kasei Kogyo Kabushiki Kaisha, Osaka, Japan

[22] Filed: Aug. 17, 1972

[21] Appl. No.: 281,452

[30] Foreign Application Priority Data
Aug. 21, 1971 Japan.............................. 46-63859
Sept. 6, 1971 Japan.............................. 46-68059

[52] U.S. Cl.................................. 203/43, 260/499
[51] Int. Cl............................................ B01d 11/00
[58] Field of Search............ 203/43, 44, 52, 57, 58, 203/70, 69, 68; 260/499, 469

[56] References Cited
UNITED STATES PATENTS
2,081,721  5/1937  Van Dijck.......................... 260/499
3,324,156  6/1967  Elder................................. 260/499
3,394,057  7/1968  Miller............................... 260/499
3,542,852  11/1970 Selwitz............................ 260/476 R
3,600,429  8/1971  Kronig............................. 260/476 R
3,616,271  10/1971 Copelin............................ 203/69
3,681,204  8/1972  Mercier............................ 260/499

Primary Examiner—A. Louis Monacell
Assistant Examiner—Frank Sever
Attorney, Agent, or Firm—Cooper, Dunham, Clark, Griffin & Moran

[57] ABSTRACT

Describes method for separating and recovering starting materials and reaction products from preparation of aryl esters of aliphatic carboxylic acids formed by reaction of aryl hydrocarbons, aliphatic carboxylic acids and oxygen in the presence of palladium type catalysts and nitric acid by distillation and extraction with paraffinic or naphthenic type hydrocarbons.

10 Claims, 1 Drawing Figure

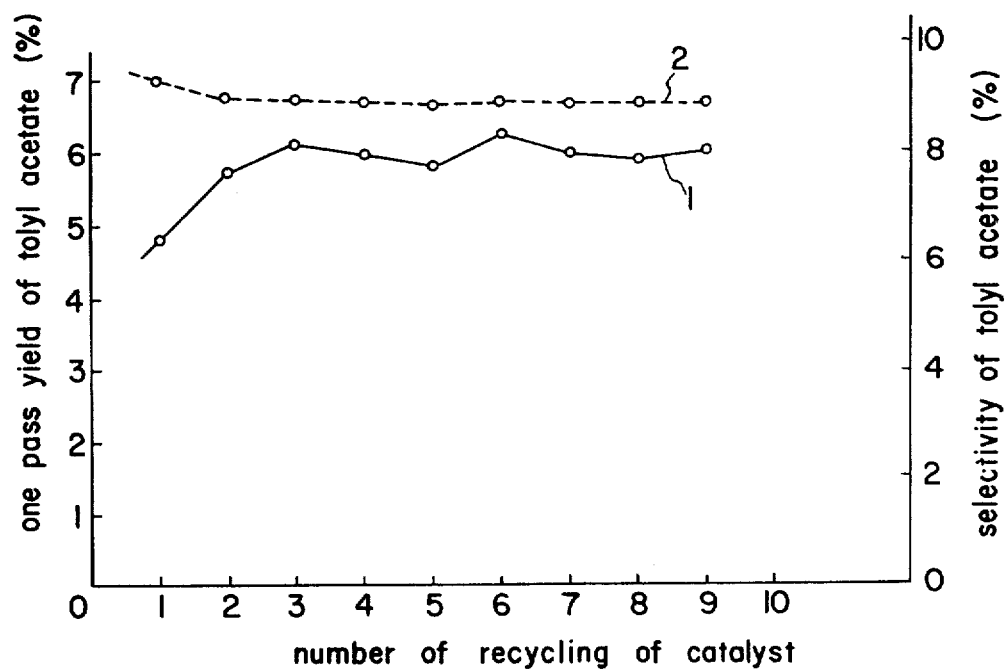

EXTRACTIVE RECOVERY OF PALLADIUM CATALYST IN THE PRESENCE OF NITRIC ACID FROM THE RESIDUE OF AN ARYL ESTER DISTILLATION

BACKGROUND OF INVENTION

It is known to prepare aryl esters of aliphatic carboxylic acids by reacting an aromatic hydrocarbon with an aliphatic carboxylic acid and oxygen in the presence of a palladium-containing or palladium type catalyst in the presence of a small amount of nitric acid. The following chemical formula illustrates the course of the reaction:

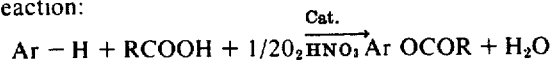

$$Ar - H + RCOOH + 1/2O_2 \xrightarrow[HNO_3]{Cat.} Ar\ OCOR + H_2O$$

In the formula, Ar is an aryl group, for example, an aryl group containing up to about 10 carbon atoms, for example, phenyl, tolyl, ethylphenyl, butylphenyl, xylyl, cumenyl, mesityl and like substituted and unsubstituted aryl groups. R is an alkyl group suitably a straight or branched chain hydrocarbon alkyl group, such as ethyl, propyl, butyl, amyl, hexyl and the like RCOO is, accordingly the corresponding acyloxy group which is substituted on the aryl ring.

The palladium type catalyst used in this process may be either metallic palladium, palladium compounds or mixtures of these. Typically useful palladium compounds include the acetate, propionate, nitrate and oxide. The catalyst may be promoted of any of a variety of metals or metal compounds or by an aliphatic carboxylic acid salt of an alkali or alkaline earth metal. Typically useful metals include copper, zinc, cadmium, uranium, tin, lead, vanadium, antimony, bismuth, chromium, tellurium, manganese, iron, cobalt, nickel and thallium, and these are often utilized in the form of their salts, particularly lower aliphatic carboxylic acid salts.

The process may be carried out in the gas phase or in the liquid phase. This invention is particularly concerned with improvements in the reaction carried out in the liquid phase.

Because palladium and its salts are normally very expensive, it is desirable, and, in fact, often an economic necessity to recover the catalyst from the reaction for subsequent reuse.

THE INVENTION

This invention is concerned generally with the method of separating the reaction mixture produced in the above described reaction, and, more particularly, with the recovery of the valuable catalyst in a facile, efficient and inexpensive manner. A surprising and very valuable aspect of the invention is that the catalyst, which is normally recovered in the form of a liquid nitric acid-catalyst mixture, may be reused without further purification.

The invention, therefore, comprises methods for the separation of liquid reaction mixtures from the production of aryl esters of aliphatic carboxylic acids formed by reacting an aromatic hydrocarbon with an aliphatic carboxylic acid and oxygen in the presence of a palladium type catalyst. In accordance with the method, the reaction mixture is first distilled to separate principally unreacted starting materials and water. The distillation residue is thereafter extracted with selected hydrocarbon liquid extractants to provide an extract containing principally the desired aliphatic carboxylic acid aryl ester, together with varying amounts of by-products principally aromatic nitro-compounds and aldehydes. The extract may also contain a small amount of unreacted aliphatic carboxylic acid. The residue remaining from the extraction comprises principally the initial catalyst together with nitric acid. This mixture, with no appreciable loss of catalytic activity, is in a form ready for reuse.

It has been observed that the extraction efficiency for recovery of the ester product may be as high as 85% or higher. The separation procedure of this invention may be carried out in a batch-wise manner, or in the presence of nitric acid, in a continuous manner. The latter is preferred since it is most economical, and since the recovery of the catalyst is simplified. In the absence of nitric acid, the catalyst often collects on the walls of the extraction vessel as a gummy tar-like residue.

In the first phase of the process of the invention, the reaction mixture is distilled to recover principally unreacted starting materials and water. The temperature at which the distillation is carried out is not critical, as long as it is not so high as to initiate decomposition of any of the reactants or products. Typically, the distillation may be effected at a temperature of from about 20°C to 120°C at a pressure of from about 10 to 900 millimeters of mercury. In batch-wise operations, the distillation step is normally carried out at a temperature of from about 20°C to 100°C. at a pressure from about 10 to 700 millimeters of mercury. When the distillation is effected in the course of a continuous operation, the temperature may be from about 50°C to 120°C and the pressure from about 300 to 900 millimeters of mercury.

In the next step of the process of the invention, the distillation residue is extracted with a liquid hydrocarbon. As aforesaid, especially for continuous operation, it is preferred to carry out the extraction in the presence of added nitric acid. Concentrated nitric acid is utilized, and it may be added either to the distillation residue or to the extraction medium. The amount of acid added is preferably sufficient to reconstitute the catalyst mixture in a form such that it can be recycled for reuse, and will contain the amounts of nitric acid normally employed in carrying out the basic reaction. Generally, these amounts range from about 0.001 mole to 0.2 mole per mole of aliphatic carboxylic acid used in carrying out the main reaction.

In the course of the reaction, the main product, i.e., the aliphatic carboxylic acid aryl ester, is separated from the distillation residue into the extraction medium together with small amounts of by-product, aromatic nitro-compounds and aldehydes which are often present. The distillation residue may also contain a small amount of unreacted aliphatic carboxylic acid. It is often convenient to recover the carboxylic acid from the extraction solvent by a further extraction with water. The water phase containing aliphatic carboxylic acid thus obtained may be utilized directly in a subsequent batch-wise reaction or may be continuously returned to the reaction mixture in a continuous reaction.

The extraction liquids utilized in this invention may be either paraffinic hydrocarbons or naphthenic hydrocarbons which are liquid above 10°C. and whose boiling temperature at normal pressure is from about 45° to 125°C. Typically, the hydrocarbons will contain from about five to eight carbon atoms. The preferred paraffinic hydrocarbons will contain from six to eight carbon atoms and may be selected from amongst straight and branched chain hexanes, heptanes and octanes. The preferred naphthenic hydrocarbons will contain from five to seven carbon atoms and may be selected from saturated alicyclic and alkyl substituted alicyclic compounds such as cyclopentane, cyclohexane, cycloheptane, methylcyclopentane and methylcyclohexane. It may sometimes be convenient to use mixtures of extraction liquids.

The amount of extraction agent utilized in the process of this invention may vary within very wide limits depending upon a variety of factors such as the identity of the ester product, the desired extraction efficiency, and the selected agent. It has been found that useful results can be obtained when the extraction liquid to distillation residue ratio varies as much as from about 2:1 to 200:1, although for reasons of economy, ease of operation and extraction efficiency the preferred ratio is from 5:1 to 50:1. The method of extraction is not critical and may be counter current, cocurrent or multistage.

As aforesaid, the liquid catalyst in condition for reuse without further purification remains as an extraction residue.

The materials including the reaction product contained in the extraction mixture may be separated by any convenient process, typically by fractional distillation. The separation step may be carried out as part of a continuous process which involves the continuous return of the extraction medium to the extraction vessel. Any of a number of continuous methods of operation can be readily devised by those skilled in the art. Typical methods are illustrated in the examples.

The following non-limiting examples are given by way of illustration only:

EXAMPLE 1

A mixture containing 0.23 g. of palladium acetate, 0.5 g. of manganese acetate (as a catalyst promoter), 10 cc. of benzene, 90 cc. of acetic acid and 0.2 cc. of concentrated nitric acid were placed in an autoclave and the pressure was increased to 30 kg/cm$^2$ by the introduction of oxygen. The mixture was heated at 140°C. for 2 hours with stirring.

At the end of the reaction period the mixture contained:

| | | |
|---|---|---|
| benzene | 7.1 | g. |
| acetic acid | 88.6 | g. |
| phenyl acetate | 2.8 | g. |
| nitrobenzene | 0.14 | g. |
| water | 0.42 | g. |
| nitric acid | 0.2 | cc. |
| palladium acetate | 0.23 | g. |
| manganese acetate | 0.5 | g. |

It was distilled on a water bath at 40°C. to 75°C. at 150 mm to remove 7.0 g. benzene, 80.1 g. acetic acid and 0.4 g. water.

The residue was extracted in a separatory funnel with 20 cc. of cyclohexane. The cyclohexane phase upon analysis by gas chromatography was found to contain:

| | | |
|---|---|---|
| phenyl acetate | 2.5 | g. |
| nitrobenzene | 0.1 | g. |
| acetic acid | 0.6 | g. |

The extraction efficiency was therefore 89%. The catalyst promoter and nitric acid remained as a liquid residue which was suitable for reuse without further purification.

EXAMPLE 2

A catalyst containing 0.23 g. palladium acetate, 0.1 g. lithium acetate and 0.1 g. copper acetate supported on 50 cc. of silica gel was mixed with 10 cc. toluene, 90 cc. acetic acid and 0.2 cc. concentrated nitric acid in an autoclave and the pressure was increased to 80 kg/cm$^2$ by the introduction of air. The mix was heated at 130°C. for 5 hours with agitation.

At the end of the reaction period the mixture contained:

| | |
|---|---|
| ortho tolyl acetate | 5.3 mole % |
| meta tolyl acetate | 4.0 mole % |
| para tolyl acetate | 5.8 mole % |
| total tolyl acetate | 79 g. |
| toluene | 7.1 g. |
| acetic acid | 79 g. |
| benzaldehyde | 2.14 g. |
| nitrotoluene (o, m and p) | 0.04 g. |
| water | 0.34 g. |
| catalyst | same as original |
| nitric acid | same as original |

It was distilled under the same conditions as Example 1 to produce a distillate containing 7.0 g. toluene, 72 g. acetic acid and 0.32 g. water.

The residue was extracted in a separatory funnel with 20 cc. of isooctane. The isooctane phase was extracted with water to separate acetic acid into the water phase. The isooctane phase upon analysis was found to contain:

| | |
|---|---|
| tolyl acetate (o, m and p) | 1.95 g. |
| benzaldehyde | 0.04 g. |
| nitrotoluene (o, m and p) | 0.15 g. |

The extraction efficiency was therefore 90%.

The catalyst remained as a residue from the original isooctane extraction and was suitable for reuse without further purification.

EXAMPLE 3

A mixture containing 0.23 g. palladium acetate, 0.5 manganese nitrate, 10 cc. benzene, 90 cc. acetic acid and 0.2 cc. nitric acid was heated in an autoclave with stirring for 2 hours at 146°C. under 30 kg/cm$^2$ of air pressure. The resulting reaction mixture contained:

| | |
|---|---|
| benzene | 7.1 g. |
| acetic acid | 88.6 g. |
| phenyl acetate | 2.8 g. |
| nitrobenzene | 0.14 g. |
| water | 0.42 g. |
| catalyst | same as original |
| nitric acid | same as original |

The mixture was distilled under the same conditions as Example 1 to produce a distillate containing 7.0 g. benzene, 80.1 g. acetic acid and 0.4 g. water.

The residue was extracted with 20 cc. cyclohexane containing 0.2 cc. concentrated nitric acid. The cyclohexane phase was separated and washed with water to extract its acetic acid content. It was analyzed and found to contain:

| | |
|---|---|
| phenyl acetate | 2.5 g. |
| nitrobenzene | 0.1 g. |
| acetic acid | 0.4 g. |

The residue from the original cyclohexane extraction amounted to 7.5 cc. To this liquid catalyst residue there was added 10 cc. benzene and 82.5 cc. acetic acid. The mixture was heated in an autoclave at 146°C. for 2 hours with stirring under 80 kg/cm$^2$ of oxygen pressure. The resulting mixture contained 18.2 mole percent phenyl acetate and 1.1 mole percent nitrobenzene, based on the original benzene added. This establishes that the activity of the catalyst liquid is not affected by the separation procedure.

EXAMPLE 4

A mixture containing 0.25 g. palladium nitrate, 0.15 g. bismuth nitrate, 10 cc. tertiary butyl benzene, 50 cc. acetic acid and 0.5 cc. concentrated nitric acid was heated for 3 hours at 120°C. with agitation in an autoclave under 50 kg/cm$^2$ oxygen pressure to produce a reaction mixture containing (based on charged tertiary butyl benzene):

| | |
|---|---|
| m-tertiary butyl phenyl acetate | 6.4 mole % |
| p-tertiary butyl phenyl acetate | 7.2 mole % |

The mixture was distilled at 40 mm. of mercury on a water bath maintained at 30°C. to 85°C. to distill off unreacted tertiary butyl benzene, acetic acid and water. To the residue there was added 0.5 cc. of concentrated nitric acid, and the mixture was gradually added to 20 cc. of methyl cyclopentane in a separatory funnel.

The lower layer (12.2 cc.) of catalyst liquid was separated and mixed with 10 cc. tertiary butyl benzene and 37.8 cc. acetic acid. The mixture was reacted in an autoclave under the same conditions described above. The resulting product contained 7.0 mole percent m-tertiary butyl phenyl acetate, 7.4 mole percent p-tertiary butyl phenyl acetate and 1.3 mole percent tertiary butyl nitrobenzene, all based on the original charge of tertiary butyl benzene.

The original methyl cyclopentane layer from the extraction step was analyzed by gas chromatography, and it was found that 88% of the reaction product was separated by extraction.

EXAMPLE 5

This example illustrates one method of continuous operation.

One liter of initial reaction mixture was prepared by mixing 100 cc. toluene, 85 cc. acetic acid, 5 cc. concentrated nitric acid, 2.8 g. palladium acetate and 12.8 g. manganese acetate. This mixture was introduced into a 120 cc. autoclave equipped with a stirrer at the rate of 40 cc./hr. while introducing oxygen at the rate of 1 liter per minute. The reaction was continuously carried out at 120°C. and an oxygen pressure of 20 kg/cm$^2$. The mixture was continuously withdrawn from the autoclave and stripped of oxygen with a gas separator. The reaction liquid, free of oxygen, was collected in a trap and treated as described below to separate unreacted materials, reacted products and liquid catalyst.

To the liquid catalyst, as separated, there was added one liter of toluene and acetic acid in the same ratio as in the original starting mixture, and this mixture was introduced into the original autoclave. This addition was effected without interrupting the continuous reaction in the following manner.

When half of the first starting solution was consumed, 500 cc. of the reaction liquid was taken out of the trap and treated as described below, separating 25 cc. of the catalyst liquid, to which 50 cc. of toluene and 425 cc. of acetic acid were added, preparing 500 cc. of solution, i.e., half of the second starting solution. Thus prepared second starting solution was continuously introduced into autoclave after 1 l. of the first starting solution was passed. Then, when the remaining half of the first starting solution was consumed, i.e., at the end of the first cycle, the collected reaction liquid 500 cc. was taken out of the trap and similarly treated to separate catalyst liquid. To this catalyst liquid, there were added toluene and acetic acid as aforementioned to prepare another 500 cc. of the second starting solution. The thus prepared solution was continuously introduced into the autoclave following said first 500 cc. of the second starting liquid so that the reaction of the second cycle completed.

The reaction on and after the third cycle was continuously carried out by repetitively employing the catalyst separated as aforementioned.

The separation of unreacted matter, reaction product and catalyst liquid from 500 cc. of the reaction liquid which was taken out from the trap during the operation was made as follows:

500 cc. of the reaction liquid taken out from the trap was first treated by evaporation (pressure 60 mm Hg) to remove toluene, a major part of acetic acid, nitric acid and water, the reaction liquid being concentrated to 50 cc. To this concentrated liquid 50 cc., there was added 2.5 cc. of concentrated nitric acid, and then 100 cc. of cyclohexane was slowly added to extract the reaction product. After removing the catalyst liquid (I) which was separated as a lower layer, 10 cc. of water was added to the upper cyclohexane layer to separate it into two layers. 40 cc. of lower aqueous layer was taken out, concentrated to 10 cc. and 20 cc. of cyclohexane was added for extraction of the product and catalyst liquid (II) separated.

The catalyst (I) and (II) formed 25 cc. of the catalyst liquid. Thus obtained catalyst liquid contained substantially no reaction product. Then, to 25 cc. of the catalyst liquid, 50 cc. of toluene and 425 cc. of acetic acid were added as aforementioned to form 500 cc. of starting liquid, was was recycled to the reaction system for reuse.

The cyclohexane extract was stripped of cyclohexane by distillation, and the reaction product was recovered by fractionation.

The drawing illustrates the result as a graph that the same catalyst was recycled for reuse nine times. In the graph, the abscissa is the number of cycles, the left axis the one pass yield (%) of tolyl acetate based on toluene and the right axis the selectivity (%) of formed tolyl acetate. Curve 1 shows the yield of tolyl acetate obtained in this Example and curve 2 is the selectivity of tolyl acetate obtained in this Example.

From the result as shown in the graphs, it is apparent that the catalyst in the reaction liquid can be recycled to the reaction system for reuse without degradation, loss of activity and damage.

EXAMPLE 6

3 g. of palladium acetate, 1.5 g. of ferric nitrate and 8.5 g. of manganese acetate were dissolved in 1 l. of acetic acid. To this solution, there were added 590 cc. of acetic acid, 400 cc. of benzene and 10 cc. of concentrated nitric acid to prepare 2 l. of a homogeneous solution. The solution was continuously introduced into an autoclave at a rate of 200 cc./hour, while passing oxygen gas at a rate of 1 l./min. through another inlet. The reaction was continuously carried out under a total pressure of 20 kg/cm$^2$ and at 170°C.

The pressurized liquid-gas mixture continuously flowing out was converted to normal pressure through a baffle valve to flash distill it at 100°C. Thus major part of benzene, water and acetic acid were discharged, and residue collected.

To this residue, there was added 1 cc. of concentrated nitric acid per 20 cc. of residue and countercurrent extraction was effected with n-heptane. The reactant was washed with water in the usual manner. The heptane was recovered by steam distillation. To the catalyst liquid in the aqueous residue from the steam distillation there were added 1.59 l. of acetic acid and 0.4 l. of benzene and the whole was subjected to reaction under the identical conditions described above. The results are tabulated in Table 1.

| Reactant & Product | Reaction Liquid (in 2 l.) (g) | Flash distillation distillate (g) | Flash distillation Residue (g) | N-heptane extract (g) | After steam distillation (g) | Second reaction liquid (g) |
|---|---|---|---|---|---|---|
| Benzene | 270 | 270 | — | — | — | 274 |
| Acetic acid | 1,556 | 1,480 | 76 | 35 | trace | 1,558 |
| Water | 14.0 | 14 | — | — | — | 13.8 |
| Phenyl acetate | 93.4 | 6.4 | 87 | 78 | 73 | 101.9 |
| Nitrobenzene | 8.5 | 0.6 | 7.9 | 7.0 | 7 | 9.7 |
| Biphenyl | 1.5 | 0.1 | 1.4 | 1.3 | 1.3 | 1.7 |

Note: Measurement was made by gas chromatography

We claim:

1. A method of separating the liquid reaction mixture from the production of aryl esters of aliphatic carboxylic acids formed by replacement of a hydrogen on the aryl ring with an acyloxy group by reacting an aromatic hydrocarbon with an aliphatic carboxylic acid and oxygen in the presence of nitric acid and a palladium type catalyst, Distilling the reaction mixture to separate unreacted starting materials and esters and Extracting the distillation residue with a liquid paraffinic hydrocarbon containing from about six to eight carbon atoms or a liquid naphthenic hydrocarbon containing from about five to seven carbon atoms, to extract the reaction product and leave the catalyst together with nitric acid as a residue.

2. A method as in claim 1 wherein the distillation is effected at a pressure of from about 10 to 900 mm of mercury and a temperature of from about 20°C to 120°C.

3. A method as in claim 1 wherein the ratio of extraction liquid to distillation residue is from about 2:1 to 200:1.

4. A method as in claim 1 wherein the ratio of extraction liquid to distillation residue is from 5:1 to 50:1.

5. A method as in claim 1 including the additional step of adding to the extraction liquid or to the extraction residue from about 0.001 to 0.2 mole of nitric acid per mole of aliphatic carboxylic acid originally reacted.

6. A method as in claim 5 carried out in a continuous manner.

7. A method as in claim 1 wherein the aryl group is phenyl or substituted phenyl containing up to about ten carbon atoms and the aliphatic carboxylic acid contains up to about seven carbon atoms.

8. A method as in claim 7 wherein the aromatic hydrocarbon is benzene and the aliphatic carboxylic acid is acetic acid.

9. A method as in claim 7 wherein the aromatic hydrocarbon is toluene and the aliphatic carboxylic acid is acetic acid.

10. A method as in claim 7 wherein the aromatic hydrocarbon is tertiary butyl benzene and the aliphatic carboxylic acid is acetic acid.

* * * * *